US010738174B2

(12) United States Patent
Bajjuri et al.

(10) Patent No.: US 10,738,174 B2
(45) Date of Patent: Aug. 11, 2020

(54) AQUEOUS SOLUBLE FERRIMAGNETS STABILIZED BY BLOCK COPOLYMERS (75) Inventors: Krishna M. Bajjuri, San Jose, CA (US); David Berman, San Jose, CA (US); Qiu Dai, Dayton, OH (US); Pierre-Olivier Jubert, San Jose, CA (US); Hareem T. Maune, San Jose, CA (US); Alshakim Nelson, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1625 days.

(21) Appl. No.: 13/454,054

(22) Filed: Apr. 23, 2012

(65) Prior Publication Data
US 2013/0281623 A1 Oct. 24, 2013

(51) Int. Cl.
| C08L 53/00 | (2006.01) |
| B82Y 40/00 | (2011.01) |
| H01F 1/053 | (2006.01) |
| C08K 3/22 | (2006.01) |
| C08F 293/00 | (2006.01) |
| H01F 1/00 | (2006.01) |
| B82Y 30/00 | (2011.01) |

(52) U.S. Cl.
CPC ............ *C08K 3/22* (2013.01); *C08F 293/005* (2013.01); *C08L 53/00* (2013.01); *H01F 1/0054* (2013.01); *B82Y 30/00* (2013.01); *B82Y 40/00* (2013.01); *C08F 2438/01* (2013.01); *C08K 2201/01* (2013.01)

(58) Field of Classification Search
CPC .. C08F 293/005; C08F 2438/01; C08L 53/00; C08K 2201/01; H01F 1/0054; B82Y 30/00; B82Y 40/00
See application file for complete search history.

(56) References Cited

U.S. PATENT DOCUMENTS

| 4,654,267 | A | 3/1987 | Ugelstad et al. | |
|---|---|---|---|---|
| 4,774,265 | A | 9/1988 | Ugelstad et al. | |
| 6,593,058 | B1 | 7/2003 | Feiring et al. | |
| 6,639,036 | B2 | 10/2003 | Park et al. | |
| 6,989,224 | B2 | 1/2006 | Adams et al. | |
| 7,147,985 | B2 | 12/2006 | Yueh et al. | |
| 7,189,491 | B2 | 3/2007 | Rahman | |
| 7,276,323 | B2 | 10/2007 | Feiring et al. | |
| 7,854,878 | B2 | 12/2010 | Hedrick et al. | |
| 2005/0175702 | A1* | 8/2005 | Muller-Schulte ...... | A61K 41/00 424/486 |
| 2005/0249817 | A1* | 11/2005 | Haik ...................... | A61K 33/24 424/617 |
| 2007/0264199 | A1* | 11/2007 | Labhasetwar et al. ...... | 424/9.32 |
| 2008/0203351 | A1* | 8/2008 | Gao et al. ............... | 252/62.51 R |
| 2009/0220431 | A1* | 9/2009 | Cheon ................ | A61K 49/0002 424/9.32 |
| 2010/0099042 | A1 | 4/2010 | Ohashi et al. | |
| 2011/0275985 | A1* | 11/2011 | Lowery et al. ................. | 604/66 |

FOREIGN PATENT DOCUMENTS

| CN | 101241788 A | 8/2008 |
| CN | 101612541 A | 12/2009 |
| CN | 101923932 A | 12/2010 |
| WO | WO 2004071386 A2 * | 8/2004 |
| WO | 2007110917 A1 | 10/2007 |
| WO | WO 2010002479 A1 * | 1/2010 |

OTHER PUBLICATIONS

Guiying et al; Journal of Polymer Science: Part A: Polymer Chemistry; vol. 46, 2008, pp. 5028-5035.*
Superparamagnetism; Wikipedia; 2010.*
Ferrimagnetism; Wikipedia; 2009.*
Ferrites; Wikipedia; Mar. 2011.*
Spontaneous; Wikipedia; downloaded on Nov. 17, 2017.*
Ahmed et al., Magnetic properties and morphology of block copolymer-cobalt oxide nanocomposites, J. Mag. and Mag. Mater. 288:219-223 (2005).
Benkoski et al., Field Induced Formation of Mesoscopic Polymer Chains from Functional Ferromagnetic Colloids, J. Am. Chem. Soc., 129:6291-6297 (2007).
Bowles et al., Magnetic Assembly and Pyrolysis of Functional Ferromagnetic Colloids into One-Dimensional Carbon Nanostructures, J. Am. Chem. Soc., 129:8694-8695 (2007).
Dai et al., Monodisperse Cobalt Ferrite Nanomagnets with Uniform Silica Coatings, Langmuir 26(22):17546-17551 (2010).
Dai et al., Self-Assembled Ferrimagnet-Polymer Composites for Magnetic Recording Media, Nano Lett. 10:3216-3221 (2010).
Glogowski et al., Functionalization of Nanoparticles for Dispersion in Polymers and Assembly in Fluids, J. Polymer Science: Part A: Polymer Chemistry, 44:5076-5086 (2006).
Hong et al., Surface PEGylation and Ligand Exchange Chemistry of FePt Nanoparticles for Biological Applications, Chem. Mater 17:4617-4621 (2005).
Keng et al., Synthesis and Self-Assembly of Polymer-Coated Ferromagnetic Nanoparticles, ACS Nano, 1(4):279-292 (2007).
Korth et al., Polymer-Coated Ferromagnetic Colloids from Well-Defined Macromolecular Surfactants and Assembly into Nanoparticle Chains, J. Am. Chem. Soc., 128:6562-6563 (2006).

(Continued)

*Primary Examiner* — Karuna P Reddy
(74) *Attorney, Agent, or Firm* — Karen Canaan; CanaanLaw, P.C.

(57) ABSTRACT

The present invention relates to a water-soluble polymer complex that includes a water-soluble block copolymer and a magnetic nanoparticle, wherein the water-soluble polymer complex has a nonzero net magnetic moment in the absence of an applied magnetic field at ambient temperatures. The water-soluble block copolymer is preferably a diblock or triblock copolymer and the magnetic nanoparticle is preferably a ferrimagnetic or ferromagnetic nanoparticle. The water-soluble complexes may be derivatized with reactive groups and conjugated to biomolecules. Exemplary water-soluble polymer complexes covered under the scope of the invention include $PEG_{112}$-b-$PAA_{40}$ modified $CoFe_2O_4$; $NH_2$-$PEG_{112}$-b-$PAA_{40}$ modified $CoFe_2O_4$; $PNIPAM_{68}$-b-$PAA_{28}$ modified $CoFe_2O_4$; and mPEG-b-PCL-b-PAA modified $CoFe_2O_4$.

27 Claims, 9 Drawing Sheets

(56) References Cited

OTHER PUBLICATIONS

Park et al., Enabling nanotechnology with self assembled block copolymer patterns, Polymer 44:6725-6760 (2003).
Shukoor et al., Fabrication of a Silica Coating on Magnetic y-Fe2O3 Nanoparticles by an Immobilized Enzyme, Chem. Mater. 20:3567-3573 (2008).
Sun et al., Polymer Mediated Self-Assembly of Magnetic Nanoparticles, J. Am. Chem. Soc., 124(12):2884-2885 (2002).
Sun et al., Monodisperse MFe2O4 (M ) Fe, Co, Mn) Nanoparticles, J. Am. Chem. Soc., 126:273-279 (2004).
Vadala et al., Block copolysiloxanes and their complexation with cobalt nanoparticles, Polymer 45:7449-7461 (2004).
FluidMAG-Amine Product Spec Sheet (Article 4121), Chemicell GmbH (printed Mar. 14, 2012 from www.chemicell.com).
FluidMAG-Ara Product Spec Sheet (Article 4115), Chemicell GmbH (printed Mar. 14, 2012 from www.chemicell.com).
FluidMAG-Bromoacetyl Product Spec Sheet (Article 4128), Chemicell GmbH (printed Mar. 14, 2012 from www.chemicell.com).
FluidMAG-Chitosan Product Spec Sheet (Article 4118), Chemicell GmbH (printed Mar. 14, 2012 from www.chemicell.com).
FluidMAG-CMX Product Spec Sheet (Article 4106), Chemicell GmbH (printed Mar. 14, 2012 from www.chemicell.com).
FluidMAG-CT Product Spec Sheet (Article 4122), Chemicell GmbH (printed Mar. 14, 2012 from www.chemicell.com).
FluidMAG-D Product Spec Sheet (Article 4101), Chemicell GmbH (printed Mar. 14, 2012 from www.chemicell.com).
FluidMAG-DEAE Product Spec Sheet (Article 4102), Chemicell GmbH (printed Mar. 14, 2012 from www.chemicell.com).
FluidMAG-DP Product Spec Sheet (Article 4103), Chemicell GmbH (printed Mar. 14, 2012 from www.chemicell.com).
FluidMAG-DX Product Spec Sheet (Article 4104), Chemicell GmbH (printed Mar. 14, 2012 from www.chemicell.com).
FluidMAG-DXS Product Spec Sheet (Article 4105), Chemicell GmbH (printed Mar. 14, 2012 from www.chemicell.com).
FluidMAG-Lipid Product Spec Sheet (Article 4119), Chemicell GmbH (printed Mar. 14, 2012 from www.chemicell.com).
FluidMAG-OS Product Spec Sheet (Article 4113), Chemicell GmbH (printed Mar. 14, 2012 from www.chemicell.com).
FluidMAG-P Product Spec Sheet (Article 4123), Chemicell GmbH (printed Mar. 14, 2012 from www.chemicell.com).
FluidMAG-PAA Product Spec Sheet (Article 4108), Chemicell GmbH (printed Mar. 14, 2012 from www.chemicell.com).
FluidMAG-PAD Product Spec Sheet (Article 4109), Chemicell GmbH (printed Mar. 14, 2012 from www.chemicell.com).
FluidMAG-PAS Product Spec Sheet (Article 4110), Chemicell GmbH (printed Mar. 14, 2012 from www.chemicell.com).
FluidMAG-PEA Product Spec Sheet (Article 4117), Chemicell GmbH (printed Mar. 14, 2012 from www.chemicell.com).
FluidMAG-PEG/P Product Spec Sheet (Article 4116), Chemicell GmbH (printed Mar. 14, 2012 from www.chemicell.com).
FluidMAG-PMO Product Spec Sheet (Article 4124), Chemicell GmbH (printed Mar. 14, 2012 from www.chemicell.com).
FluidMAG-PS Product Spec Sheet (Article 4111), Chemicell GmbH (printed Mar. 14, 2012 from www.chemicell.com).
FluidMAG-PVA Product Spec Sheet (Article 4120), Chemicell GmbH (printed Mar. 14, 2012 from www.chemicell.com).
FluidMAG-PVPY Product Spec Sheet (Article 4129), Chemicell GmbH (printed Mar. 14, 2012 from www.chemicell.com).
FluidMAG-Q Product Spec Sheet (Article 4112), Chemicell GmbH (printed Mar. 14, 2012 from www.chemicell.com).
FluidMAG-UC Product Spec Sheet (Article 4114), Chemicell GmbH (printed Mar. 14, 2012 from www.chemicell.com).

* cited by examiner 18 nm
Oleic acid-coated
$CoFe_2O_4$ FMNPs

Block copolymer-coated
$CoFe_2O_4$ FMNPs

FIG. 1

CoFe$_2$O$_4$ FMNPs

FIG. 2A

CoFe$_2$O$_4$@PEG-*b*-PAA

AQUEOUS SOLUBLE FERRIMAGNETS STABILIZED BY BLOCK COPOLYMERS

TECHNICAL FIELD

The present invention relates to water-soluble block copolymer-magnetic nanoparticle compositions that have a nonzero net magnetic moment in the absence of an applied magnetic field at ambient temperatures.

BACKGROUND OF THE INVENTION

Magnetic nanoparticles (MNPs) are useful for many biomedical applications including magnetic resonance imaging (MRI) contrast agents, hyperthermia therapies, targeted drug delivery, magnetic separation, and biosensors. Significant advances have recently been made in the synthesis of MNPs with defined composition, size, shape, and magnetic properties. Among the methodologies known in the art for preparing MNPs, high-temperature thermal decomposition of organometallic precursors in nonpolar solvents has been widely shown to be capable of producing MNPs with narrow size distribution, low crystalline defects, and tunable shapes. Currently, most biomedical applications of MNPs are focused on the use of superparamagnetic nanoparticles (SP-MNPs), which are MNPs with a magnetic dipole moment that flip randomly at room temperature. In contrast to SPMNPs, ferrimagnetic and ferromagnetic nanoparticles (FMNPs) have a permanent magnetic dipole moment at a given temperature in the absence of an applied magnetic field. The stability of FMNPs at room temperature make FMNPs promising candidates for biomolecular detection and imaging; however, unlike SPMNPs, FMNPs have the disadvantage of being subject to strong magnetic attractive interactions between the nanoparticles, which results in particle aggregation. As a result of this magnetically-induced particle aggregation, it is difficult to form high quality dispersions of FMNPs in physiological media for biomedical applications.

The effective use of FMNPs for a given biomedical application requires modifying the nanoparticle surface to: (1) improve colloidal stability in high ionic strength buffer solution; and (2) provide the surface functionality for further conjugation with biomolecules. The surface modification of FMNPs with a nonmagnetic polymer shell represents a viable route to improve the colloidal stability of FMNPs in a variety of solvents, as well as provide surface functionalities for interfacing with biological molecules. There are two primary approaches used in the formation of core-shell FMNP-polymer complexes (FMNP@polymer): (1) preformation of a polymeric template followed by nucleation and growth of FMNPs within the polymer matrix; and (2) pre-formation of the FMNP core followed by its surface modification with polymeric layers. The latter method is preferred for applications that require more rigorous uniformity of the particle shape, size, and composition.

The solution phase synthesis of ferrimagnetic $CoFe_2O_4$ nanoparticles with uniform size and morphology has progressed significantly in the last decade. One of the most commonly used solution phase methods for synthesizing $CoFe_2O_4$ is the thermal decomposition of $Fe(acac)_3$ and $Co(acac)_2$ precursors in the presence of oleic acid surfactants in a high boiling point solvent, such as benzyl ether. With this method, oleic acid surfactants protect the resulting $CoFe_2O_4$ nanoparticles and afford the nanoparticles solubility in nonpolar solvents, such as hexane. The magnetic properties of $CoFe_2O_4$ nanoparticles synthesized in this way may be changed from superparamagnetic to ferrimagnetic at room temperature by increasing the volume of the nanoparticles.

The successful synthesis of magnetic nanoparticles by the oleic acid surfactant method, however, does not ensure the successful industrial application of the nanoparticles. A disadvantage of oleic acid surfactant magnetic nanoparticle synthesis is the instability of the resulting magnetic nanoparticles, especially in the presence of FMNPs, wherein strong interparticle magnetic forces cause irreversible aggregation of the nanoparticles.

SUMMARY OF THE INVENTION

The present invention overcomes the shortcomings in the prior art by providing a composition comprising a polymer complex comprising: (i) a magnetic nanoparticle and a (ii) water-soluble block copolymer, wherein, in the absence of an applied magnetic field, the magnetic nanoparticle has a nonzero net magnetic moment at ambient temperatures.

In one embodiment of the invention, the magnetic nanoparticle comprises a magnetic material comprising at least one element selected from the group consisting of Co, Fe, Ni, Mn, Sm, Nd, Pt, and Gd. In a preferred embodiment, the magnetic nanoparticle is a ferrimagnetic or a ferromagnetic nanoparticle (FMNP).

In another embodiment, the magnetic material is an intermetallic nanoparticle, a binary alloy, or a tertiary alloy. In one embodiment, the magnetic nanoparticle may comprise an oxide of Fe and at least one element selected from the group consisting of Ba, Co, Ni, Mn, Sm, Nd, Pt, and Gd. In a preferred embodiment, the magnetic nanoparticle is selected from the group consisting of $CoFe_2O_4$, BaFeO, $SrO.6Fe_2O_3$, and $SrFe_{12}O_{19}$.

In another embodiment, the water-soluble block copolymer is in direct contact with the magnetic nanoparticle. In one embodiment, the water-soluble block copolymer comprises a polymer block selected from the group consisting of poly(ethylene glycol), poly(acrylates), poly(methacrylates), poly(esters), poly(acrylamides), poly(carbonates), poly(norbornenes), poly(acetals), poly(ketals), and derivatives thereof. In a preferred embodiment, the water-soluble block copolymer comprises a polymer block selected from poly (acrylic acid) (PAA) and poly(methacrylic acid) (PMA), wherein the polymer block binds to the surface of a preformed FMNP.

In a further embodiment, the water-soluble block copolymer has a weight average molecular weight between 1000 and 500,000. In a preferred embodiment, the water-soluble block copolymer has a weight average molecular weight between 7,000 and 30,000.

In another embodiment of the invention, the water-soluble block copolymer is a diblock copolymer, which may be selected from the group consisting of poly(ethylene glycol)-b-poly(acrylic acid) (PEG-b-PAA); $NH_2$-PEG-b-PAA; and poly(N-isopropylacrylamide)-b-poly(acrylic acid) (PNIPAM-b-PAA).

In a further embodiment of the invention the water-soluble block copolymer is a triblock copolymer, which may be selected from the group consisting of poly(ethylene glycol)-b-poly(caprolactone)-b-poly(acrylic acid) (PEG-b-PCL-b-PAA), poly(ethylene glycol)-b-poly(L-lactide)-b-poly(acrylic acid) (PEG-b-PLL-b-PAA), poly(ethylene glycol)-b-poly(D-lactide)-b-poly(acrylic acid) (PEG-b-PDL-b-PAA), and poly(ethylene glycol)-b-poly(DL-lactide)-b-poly (acrylic acid) (PEG-b-PDLL-b-PAA).

In another embodiment, the polymer complex is selected from the group consisting of $PEG_{112}$-b-$PAA_{40}$ modified $CoFe_2O_4$; $NH_2$-$PEG_{112}$-b-$PAA_{40}$ modified $CoFe_2O_4$; and $PNIPAM_{68}$-b-$PAA_{28}$ modified $CoFe_2O_4$.

In a further embodiment of the invention, the water-soluble block copolymer is terminated at one end with a reactive functionality, which may be selected from the group consisting of alcohols, amines, thiols, acrylates, maleimides, alkenes, alkynes, iodides, bromides, and chlorides.

In another embodiment of the invention, the polymer complex with the reactive functionality is conjugated with one or more fluorescent labels.

In another embodiment of the invention, the polymer complex with the reactive functionality is conjugated with one or more biomolecules. In a preferred embodiment, the biomolecules are selected from the group consisting of DNA, proteins, glycoproteins, peptides, antibodies, antigens, and carbohydrates.

In a further embodiment of the invention, the polymer complex is conjugated with one or more drugs. In a preferred embodiment, the drugs are selected from anti-inflammatory and chemotherapy agents.

In another embodiment of the invention, there is provided a method of making the composition of claim 1 comprising the steps of: (a) preparing a macroinitiator comprising a water-soluble block polymer; (b) reacting the macroinitiator of step (a) with a block polymer selected from poly(acrylic acid) (PAA) or poly(methacrylic acid) (PMA) to produce a water-soluble block copolymer; and (c) reacting the water-soluble diblock or triblock copolymer of step (b) with a magnetic nanoparticle to produce the polymer complex.

In a further embodiment of the invention, there is provided a composition comprising a polymer complex comprising a ferrimagnetic inorganic core in direct contact with a thermally responsive water-soluble copolymer shell, wherein the composition has a tunable hydrodynamic diameter in solution. In one embodiment, the ferrimagnetic inorganic core is $CoFe_2O_4$. In another embodiment, the thermally responsive water-soluble copolymer shell is $PNIPAM_{68}$-b-$PAA_{28}$.

Additional aspects and embodiments of the invention will be provided, without limitation, in the detailed description of the invention that is set forth below.

DETAILED DESCRIPTION OF THE INVENTION

Set forth below is a description of what are currently believed to be preferred embodiments of the claimed invention. Any alternates or modifications in function, purpose, or structure are intended to be covered by the claims of this application. As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

Within the context of the present invention, it is to be understood that the term "superparamagnetic nanoparticle" refers to a magnetic nanoparticle that in the absence of an applied magnetic field has a zero net magnetic moment at a given temperature.

The term "FMNP" and "FMNPs" as used herein is meant to refer to both "ferrimagnetic" and "ferromagnetic" nanoparticles. In this regard, it is to be understood that the terms "ferrimagnetic nanoparticle(s)," "ferromagnetic nanoparticle(s)," and "FMNP(s)," as used herein do not refer to particles that merely include iron; rather, the terms refer to magnetic particles that in the absence of an applied magnetic field, have a nonzero net magnetic moment at a given temperature. In one embodiment of the present invention, the ferrimagnetic and ferromagnetic nanoparticles of the present invention have a nonzero net magnetic moment at ambient temperatures. By contrast, iron-containing particles having a zero net magnetic moment are superparamagnetic particles.

The term "ambient temperatures" is used herein in its conventional sense to refer to typical room temperatures in the range of approximately 289-300 K (15-27° C.; 60-80° F.).

The magnetic nanoparticles of the present invention have ferrimagnetic and/or ferromagnetic behavior at temperatures above 200 K (−73° C.; 100° F.), preferably at temperatures above 273 K (0° C.; 32° F.), more preferably at ambient temperatures, and most preferably at 298 K (25° C.; 77° F.). The FMNPs of the present invention typically have a diameter greater than 1 nm, but not exceeding 500 nm, with diameters between 5 nm and 150 nm preferred. The magnetic nanoparticles comprise a magnetic material comprising an element selected from the group consisting of Co, Fe, Ni, Mn, Sm, Nd, Pt, and Gd. In a further embodiment, the magnetic nanoparticles comprise intermetallic nanoparticles comprising the aforesaid elements, binary alloys comprising the aforesaid elements, and tertiary alloys comprising the aforesaid elements. In another embodiment, the magnetic nanoparticles comprise an oxide of Fe comprising at least one of the aforesaid elements other than Fe (e.g., Co, Ni, Mn, Sm, Nd, Pt, and Gd). In a preferred embodiment, the magnetic nanoparticles are comprised of cobalt ferrite ($CoFe_2O_4$). In another embodiment, the magnetic nanoparticles are comprised of barium ferrite (BaFeO) or strontium ferrite ($SrO \cdot 6Fe_2O_3$ or $SrFe_{12}O_{19}$). In a further embodiment, the magnetic nanoparticles comprise an oxide surface comprising an element selected from the group consisting of Co, Fe, Ni, Mn, Sm, Nd, Pt, Gd, Yt, and Al.

In the Examples that follow, ferrimagnetic $CoFe_2O_4$ nanoparticles with a diameter of 18 nm were chosen as exemplary examples of ferrimagnetic nanoparticles due to their magnetocrystalline anisotropy and magnetic moment. The synthesis of the $CoFe_2O_4$ FMNPs used herein, which is described in Example 8, was carried out by the traditional method of thermally decomposing $Fe(acac)_3$ and $Co(acac)_2$ precursors in the presence of oleic acid surfactant in the high boiling solvent benzyl ether. The synthesized $CoFe_2O_4$ FMNPs were then used as seeds to nucleate the growth of larger $CoFe_2O_4$ FMNPs, and the process was repeated until the $CoFe_2O_4$ FMNPs were suitably large (~18 nm) to become stable ferrimagnets. The process was optimized to yield nanoparticles monodisperse in size, and without smaller nanoparticle contaminants. Vibrating sample magnetometry (VSM) confirmed that the nanoparticles were ferrimagnets at room temperature ($M_s$=80 emu/g, $H_c$=1050 Oe). The surface of the $CoFe_2O_4$ FMNPs was stabilized with oleic acid surfactants to afford solubility of the FMNPs in nonpolar solvents, such as hexane. The resulting surfactant-stabilized FMNPs do not have long-term stability in any solvents as a consequence of the magnetically-induced aggregation of the particles over time.

Figure 1:
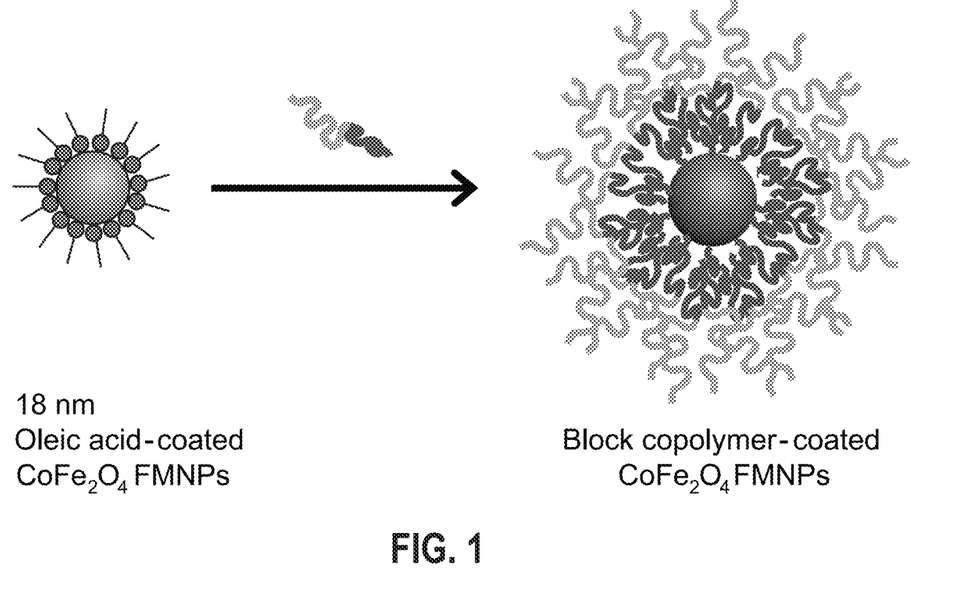
FIG. 1 is a schematic representation of $PEG_{112}$-b-$PAA_{40}$ modified $CoFe_2O_4$ FMNP.

In one embodiment of the invention, the water-soluble block copolymer comprises a poly(acrylic acid) (PAA) or poly(methacrylic acid) PMA block. The PAA or PMA block will typically have a weight average molecular weight of about 144 to 100,000 with a preferred weight averaged molecular weight of about 1,000 to 15,000. As shown in FIG. 1, the carboxylic acid groups of the PAA or PMA block bind to the surface of the nanoparticle. A result of the binding, the PAA or PMA block is able to stabilize the FMNPs in aqueous solution and prevent their magnetically-induced aggregation. Using a PAA or PMA block for stabilizing FMNPs has several advantages. First, each PAA block binds to the particle surface through multiple anchoring points, providing a more robust surface adhesion than is achievable with a small molecule possessing only one binding group. Second, the strong binding also prevents desorption of ligands from the particle surface, which improves the long-term stability of the particles. The attached polymers are also well-suited to sterically counterbalance the strong interparticle magnetic attractive forces associated with FMNPs. Thus, the molecular weight of the block copolymers provides a means to control interparticle distances to control the magnetic coupling interactions between neighboring FMNPs.

The water-soluble polymer block, which is used to prepare the water-soluble block copolymers of the present invention, have a weight averaged molecular weight of about 1000 to 500,000 with a preferred weight averaged molecular weight of about 7,000 to 30,000. Suitable compositions for the water-soluble block include, without limitation, poly(ethylene glycols), poly(acrylates), poly(methacrylates), poly(esters), poly(acrylamides), poly(carbonates), poly(norbornenes), poly(acetals), poly(ketals), and their derivatives. The solubility of the polymer block is defined by the solubility parameter of that polymer in water or aqueous media, as defined by the Hildebrand or the Hansen solubility parameter.

In one embodiment of the invention, the water-soluble block copolymer is a diblock copolymer. Examples of water-soluble diblock copolymers covered under the scope of the invention include, without limitation, poly(ethylene glycol)-b-poly(acrylic acid) (PEG-b-PAA); $NH_2$-PEG-b-PAA; and poly(N-isopropylacrylamide)-b-poly(acrylic acid) (PNIPAM-b-PAA).

In another embodiment, the water soluble block copolymer is a triblock polymer. Examples of water-soluble triblock copolymers covered under the scope of the invention include, without limitation, poly(ethylene glycol)-b-poly(caprolactone)-b-poly(acrylic acid) (PEG-b-PCL-b-PAA); poly(ethylene glycol)-b-poly(L-lactide)-b-poly(acrylic acid) (PEG-b-PLL-b-PAA); poly(ethylene glycol)-b-poly(D-lactide)-b-poly(acrylic acid) (PEG-b-PDL-b-PAA), and poly(ethylene glycol)-b-poly(DL-lactide)-b-poly(acrylic acid) (PEG-b-PDLL-b-PAA).

Figure 2A:
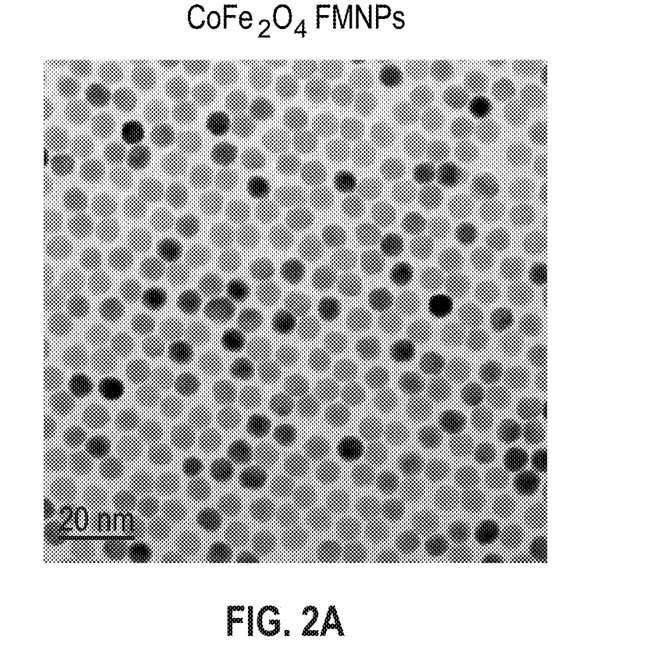
FIG. 2a is a transmission electron microscopy (TEM) image of the $CoFe_2O_4$ FMNPs before PAA modification and FIG. 2b is a TEM image of the $CoFe_2O_4$ FMNPs after surface modification with $PEG_{112}$-b-$PAA_{40}$.
Figure 2B:
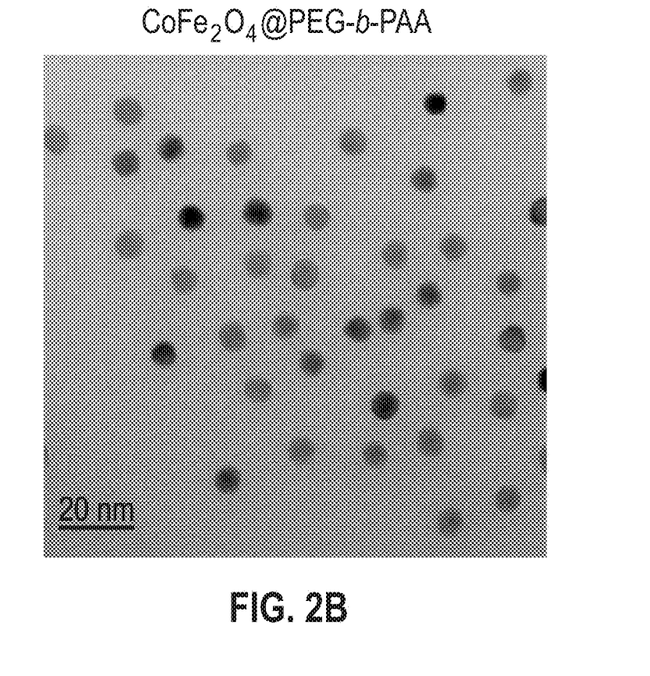

Examples 1 and 2 describe the synthesis of the diblock copolymer $PEG_{112}$-b-$PAA_{40}$, Example 6 describes the synthesis of the diblock copolymer PNIPAM-b-PAA, and Example 7 describes the synthesis of the triblock copolymer mPEG-b-PCL-b-PAA. Example 9 describes a representative procedure for formation of a $PEG_{112}$-b-$PAA_{40}$ modified $CoFe_2O_4$ FMNP covered under the scope of the present invention. FIG. 1 shows a schematic representation of the water-soluble block copolymer coated $CoFe_2O_4$ FMNPs described herein. FIG. 2 shows TEM images of the $CoFe_2O_4$ FMNP before and after modification with $PEG_{112}$-b-$PAA_{40}$. The $CoFe_2O_4$ FMNP was modified by evaporating water from the dispersion on an amorphous carbon coated copper grid. The $PEG_{112}$-b-$PAA_{40}$ modified $CoFe_2O_4$ FMNPs remain monodisperse in size without obvious shape change and aggregation. As shown in FIG. 2, the core of the $CoFe_2O_4$ FMNP does not change after modification with the $PEG_{112}$-b-$PAA_{40}$ block polymer. Both the original oleic acid-coated $CoFe_2O_4$ FMNPs and the block polymer coated $CoFe_2O_4$ FMNPs have a spherical, narrow size distribution with an average diameter of 18 nm.

Figure 3:
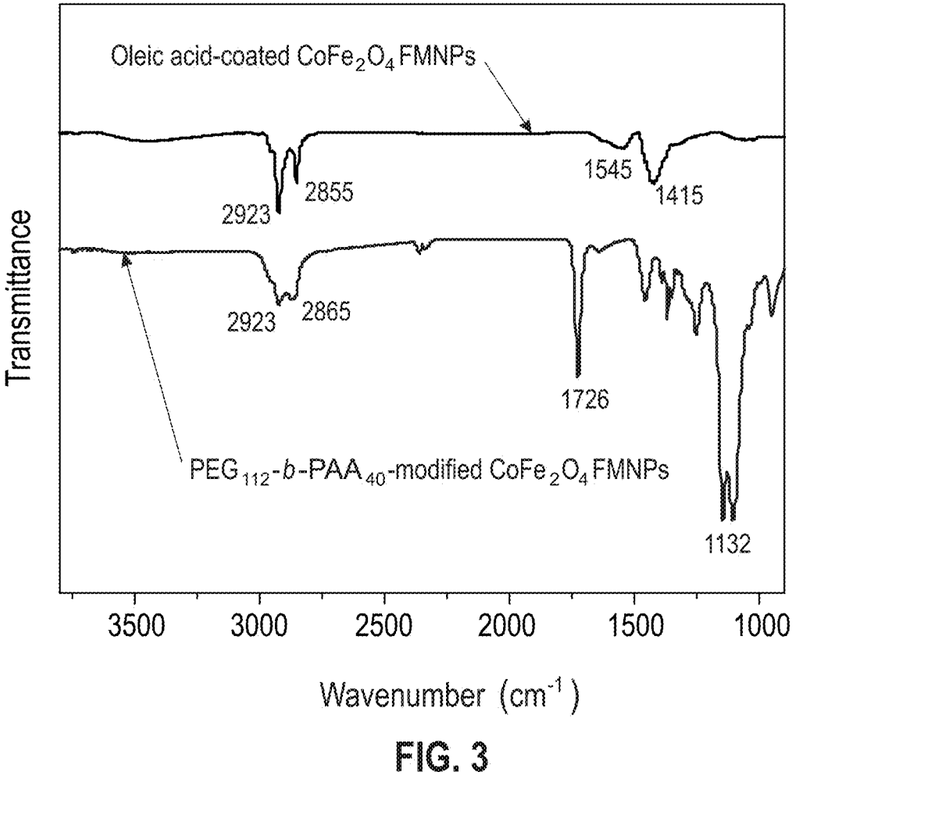
FIG. 3 is a graph showing Fourier transform infrared (FT-IR) spectroscopy of the functional groups present on the $CoFe_2O_4$ FMNP surface before and after modification with $PEG_{112}$-b-$PAA_{40}$.
Figure 4:
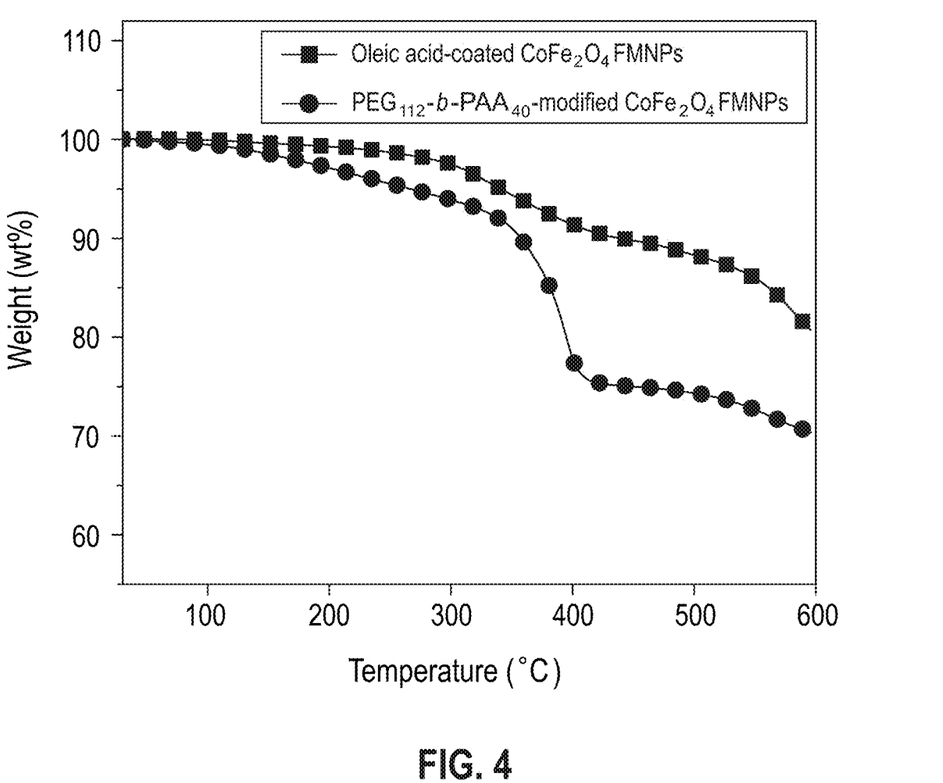
FIG. 4 is a graph showing thermogravimetric analysis of the functional groups present on the $CoFe_2O_4$ FMNP surface before and after modification with $PEG_{112}$-b-$PAA_{40}$.

As shown in FIG. 3, Fourier transform infrared (FT-IR) spectroscopy was used to characterize the functional groups present on the $CoFe_2O_4$ FMNP surface before and after the $PEG_{112}$-b-$PAA_{40}$ block copolymer modification. Before modification, the oleic acid-coated $CoFe_2O_4$ FMNPs showed strong $CH_2$ bands at 2923 $cm^{-1}$ and 2852 $cm^{-1}$; these bands are known to be characteristic for the $CH_2$ chains that are present in oleic acid. The bands at 1545 $cm^{-1}$ and 1415 $cm^{-1}$ can be assigned to the antisymmetric and symmetric vibration modes of the carboxylate groups, indicating the adsorption of oleic acid onto the particle surface. A similar spectrum is observed when oleic acid surfactants are absorbed onto an iron oxide particle surface. After ligand exchange with the $PEG_{112}$-b-$PAA_{40}$ block copolymer, a new band corresponding to the stretching mode of —COOH groups appears at 1726 $cm^{-1}$. In addition, the characteristic 1132 $cm^{-1}$ peak of PEG blocks also appears, the peak being associated with the asymmetrical stretching mode of C—O—C from PEG blocks. Thermogravimetric analysis (FIG. 4) indicates that the coverage density of the $PEG_{112}$-b-$PAA_{40}$ block copolymer on the $CoFe_2O_4$ FMNP surface is around 30 wt% after ligand exchange. These observations strongly suggest that the $PEG_{112}$-b-$PAA_{40}$ block copolymers were successfully attached onto the surface of the $CoFe_2O_4$ FMNPs in place of the oleic acid surfactants (as shown schematically in FIG. 1).

Figure 5:
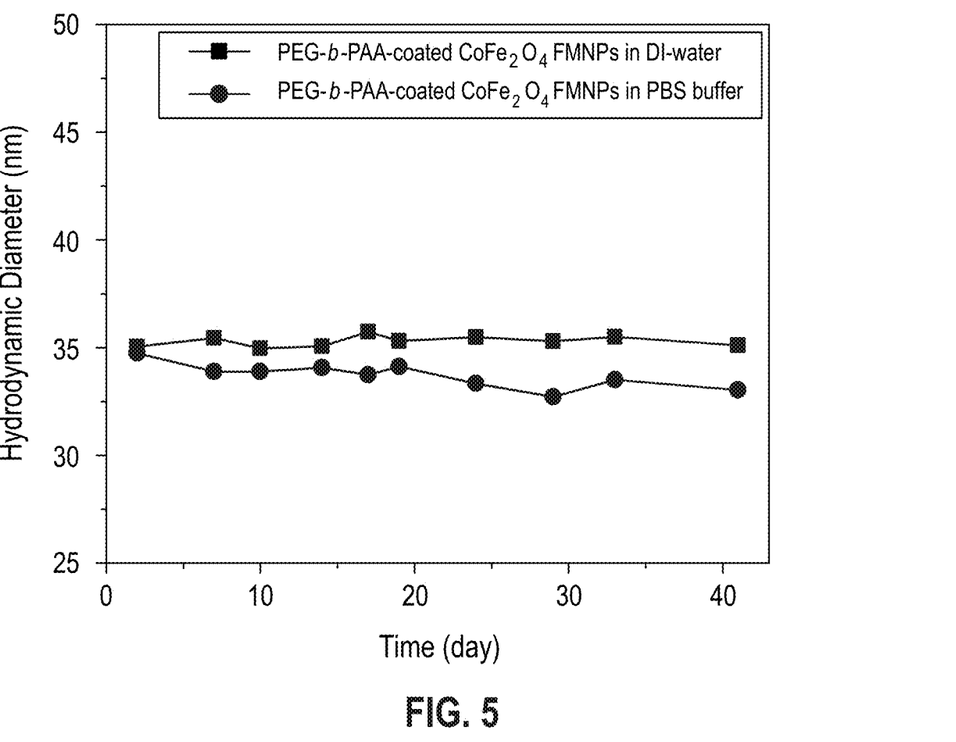
FIG. 5 is a graph showing the different hydrodynamic diameters between $PEG_{112}$-b-$PAA_{40}$ modified $CoFe_2O_4$ FMNPs in deionized water and in PBS buffer.

The 18 nm $CoFe_2O_4$ FMNPs stabilized with $PEG_{112}$-b-$PAA_{40}$ block copolymers ($CoFe_2O_4$ FMNP@$PEG_{112}$-b-$PAA_{40}$ complex) exhibit improved solubility in a range of solvents. The solubility of the $CoFe_2O_4$ FMNP@$PEG_{112}$-b-$PAA_{40}$ complex is believed to be due to the solubility characteristics of PEG blocks in both polar and nonpolar solvents. As shown in FIG. 5, the $CoFe_2O_4$ FMNP@$PEG_{112}$-b-$PAA_{40}$ complex remained very stable in aqueous solution and PBS buffer solution (NaCl concentration: 157 mM; pH=7.4). Further, no obvious change was found after storing the sample for more than 3 months under ambient conditions. The $CoFe_2O_4$ FMNP@$PEG_{112}$-b-$PAA_{40}$ complex can be freeze-dried, stored as a powder or alternatively redispersed in DI-water and PBS buffer solution without any noticeable aggregation. In a control experiment, PEG oligomers (Mn=5,000) with only one terminal carboxylate group were used to modify the 18 nm oleic acid-coated $CoFe_2O_4$ FMNPs under the same conditions. In contrast to the behavior of the $CoFe_2O_4$ FMNP@$PEG_{112}$-b-$PAA_{40}$ complex, the oleic-acid modified $CoFe_2O_4$ FMNPs did not pass filters with a cutoff of 200 nm, which demonstrated that they instantaneously formed agglomerates larger than 200 nm in diameter due to weak interaction between monocarboxylate with $CoFe_2O_4$ particle surface.

As shown in FIG. 5, the long-term colloidal stability of the 18 nm $PEG_{112}$-b-$PAA_{40}$ modified $CoFe_2O_4$ FMNPs against flocculation in DI-water and PBS buffer solution was further characterized with dynamic light scattering (DLS), which measures the hydrodynamic diameter of particles in their aqueous dispersion state. With DLS, any small flocculation of particles in solution significantly increases the average hydrodynamic diameter and broadens the size distribution as measured. As shown in FIG. 5, the hydrodynamic diameter of the $CoFe_2O_4$ FMNP@$PEG_{112}$-b-$PAA_{40}$ complex is around 35 nm with a narrow size distribution. Considering the $CoFe_2O_4$ FMNP inorganic core diameter of 18 nm from the TEM images (FIG. 2), the thickness of the $PEG_{112}$-b-$PAA_{40}$ layer attached onto the $CoFe_2O_4$ FMNP surface can be calculated to be about 7 nm. More importantly, the particle size remains at around 35 nm in both DI-water and PBS buffer solution over 40 days (FIG. 5). These DLS results indicate that the $PEG_{112}$-b-$PAA_{40}$ modified 18 nm $CoFe_2O_4$ FMNPs are individually stable over a long period of time in DI-water and PBS buffer. The substantial increase of the long-term colloidal stability of the $CoFe_2O_4$ FMNP@$PEG_{112}$-b-$PAA_{40}$ complex is most likely attributed to two factors. First, the multidentate binding of the PAA blocks with the $CoFe_2O_4$ FMNPs may make it more difficult for the $PEG_{112}$-b-$PAA_{40}$ block copolymer ligands to detach from the nanoparticle surface and cause the particle aggregation. Second, the PEG blocks may provide an increased steric barrier that prevents the nanoparticles from aggregating. Furthermore, the neutral PEG blocks may also serve to minimize the salt-induced charge screening effect of the $PEG_{112}$-b-$PAA_{40}$ modified $CoFe_2O_4$ FMNPs, making the complex stable in a PBS buffer solution with high ionic strength.

Figure 6A:
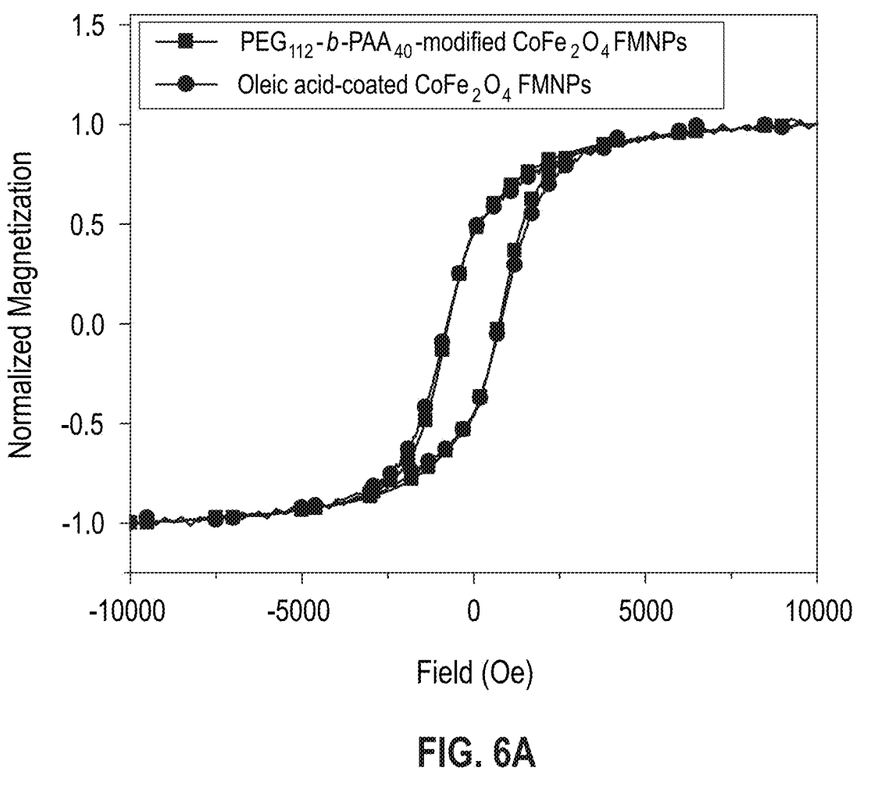
FIG. 6a is a graph showing normalized magnetization values for the $CoFe_2O_4$ FMNPs before and after modification with $PEG_{112}$-b-$PAA_{40}$.
Figure 6B:
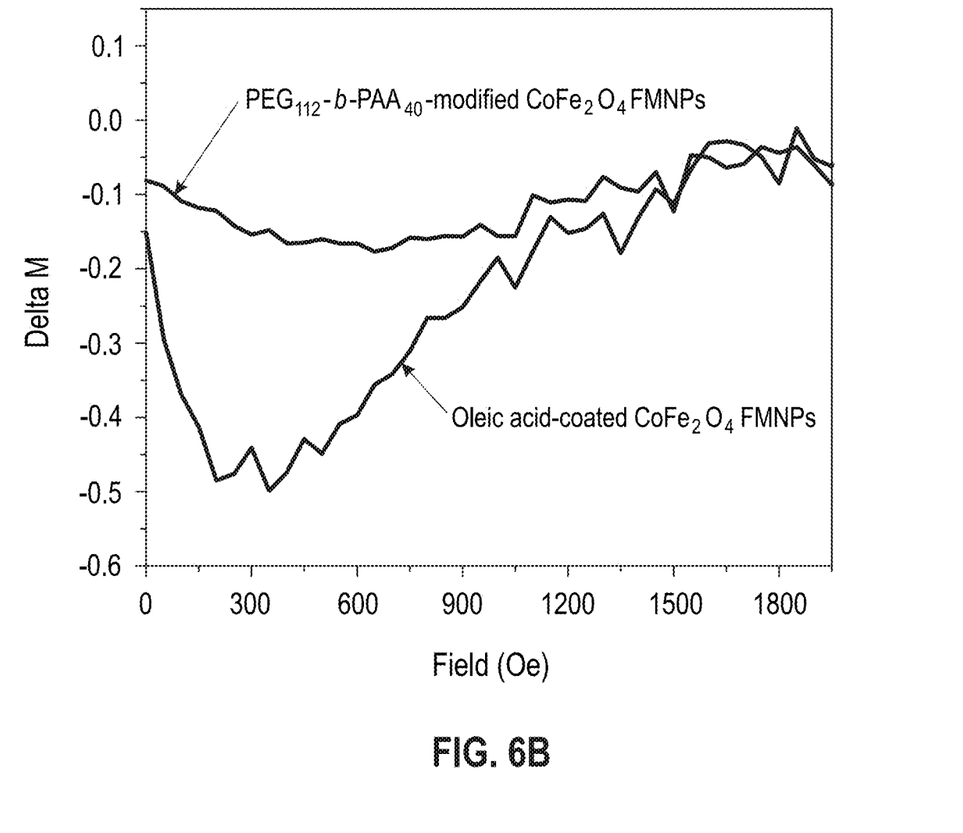
FIG. 6b is a graph showing the change in magnetism for the $CoFe_2O_4$ FMNPs before and after modification with $PEG_{112}$-b-$PAA_{40}$.

As shown in FIG. 6, the magnetic behavior of the $CoFe_2O_4$ FMNPs does not change upon formation of the complex. With reference to FIG. 6a, VSM at 298 K was used to generate hysteresis loops for the 18 nm $CoFe_2O_4$ FMNPs before and after $PEG_{112}$-b-$PAA_{40}$ diblock copolymer modification. The curves in FIG. 6a show that the $CoFe_2O_4$ FMNPs remain ferrimagnetic after $PEG_{112}$-b-$PAA_{40}$ modification, and confirm that the magnetic properties of the $CoFe_2O_4$ FMNP@$PEG_{112}$-b-$PAA_{40}$ complex were largely determined by the inorganic cores of the $CoFe_2O_4$ FMNPs and that altering the surface layer does not significantly change the magnetic properties of the $CoFe_2O_4$ FMNPs. With reference to FIG. 6b, isothermal remanent magnetization (IRM) and DC demagnetization (DCD) elucidate the magnetic coupling interactions between the $CoFe_2O_4$ FMNPs before and after $PEG_{112}$-b-$PAA_{40}$ diblock copolymer modification. For noninteracting MNPs, $\Delta M$ should be zero at any value of applied field; deviations of $\Delta M$ curves from zero in magnetic materials are interpreted as being due to magnetic coupling interactions between FMNPs. In FIG. 6b, the calculated $\Delta M$ curves show a negative peak with a magnitude of −0.5 for the oleic acid-coated 18 nm $CoFe_2O_4$ FMNPs; this negative value is indicative of strong magnetic dipole coupling interactions. Similar results were reported for ferromagnetic FePt nanoparticles coated with oleic acid surfactants. By contrast, upon modification of the 18 nm $CoFe_2O_4$ FMNPs with $PEG_{112}$-b-$PAA_{40}$, the magnitude of the $\Delta M$ value decreased to −0.2; this decrease in the magnitude of the $\Delta M$ is representative of weaker magnetic coupling interactions. The results of this experiment show that the strength of the magnetic coupling interactions of the nanoparticles is highly dependent on interparticle spacing.

In another embodiment of the invention, PNIPAM-b-PAA is used to form a complex with the 18 nm $CoFe_2O_4$ FMNPs ($CoFe_2O_4$ FMNP@$PNIPAM_{68}$-b-$PAA_{28}$ complex). Examples 5 and 6 describe the synthesis of the PNIPAM-b-PAA diblock copolymer. PNIPAM is one of the most widely studied thermally-responsive polymers. In aqueous solution, a linear PNIPAM chain undergoes a coil-to-globule transition as the temperature is raised above the lower critical solution temperature (LCST), which is around body temperature (32° C.). The $CoFe_2O_4$ FMNP@$PNIPAM_{68}$-b-$PAA_{28}$ complex is stable in aqueous solution suggesting that the $PNIPAM_{68}$-b-$PAA_{28}$ block copolymer shell provides a physical barrier that isolates and protects the enclosed $CoFe_2O_4$ FMNPs against agglomeration.

Figure 7:
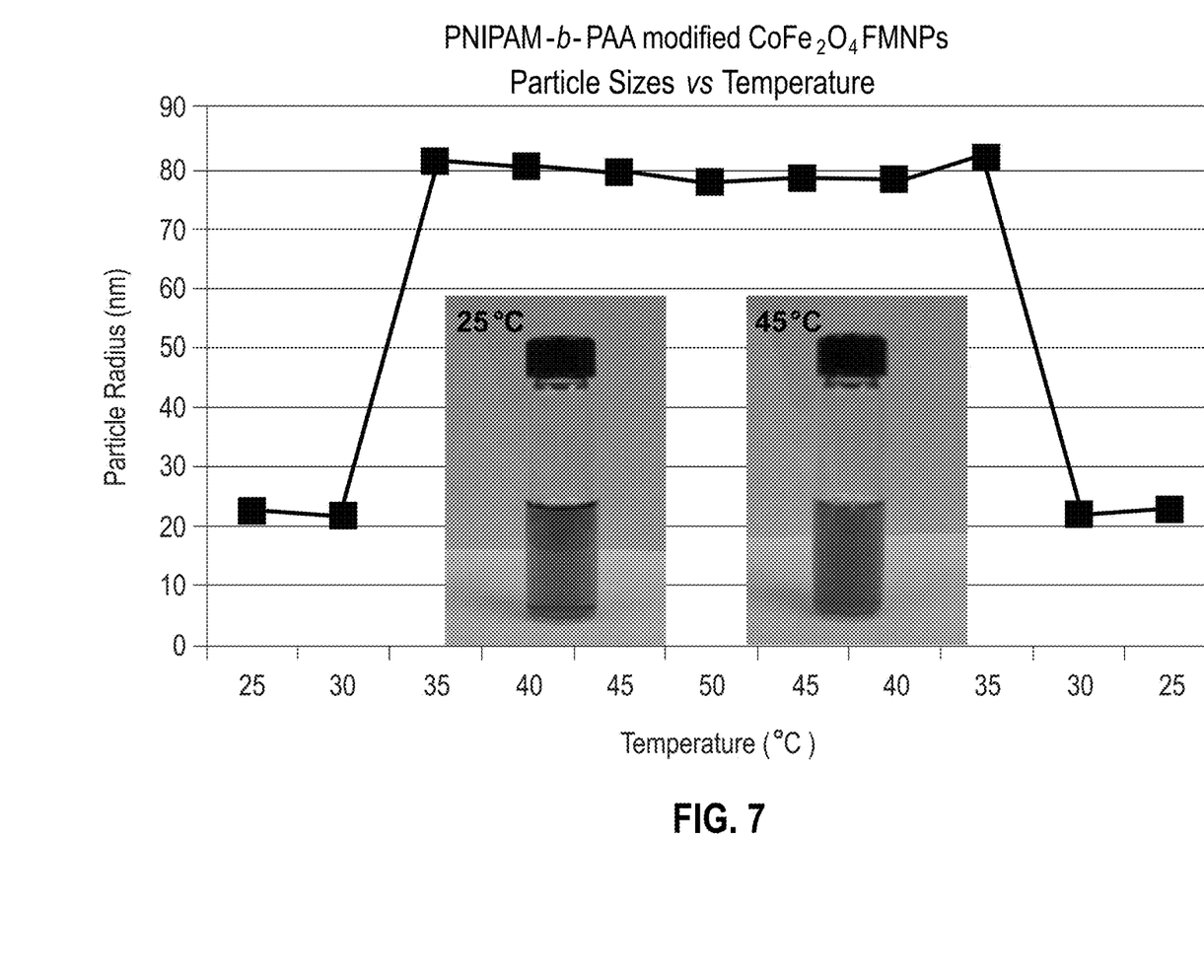
FIG. 7 is a graph showing the radius of PNIPAM-b-PAA modified $CoFe_2O_4$ FMNPs at temperatures ranging from 25-50° C.

As shown in FIG. 7, the thermal-responsive behavior of the $CoFe_2O_4$ FMNP@$PNIPAM_{68}$-b-$PAA_{28}$ complex was monitored by measuring the hydrodynamic diameter of a diluted particle suspension with a temperature variation from 25° C. to 50° C. Below the critical temperature of 32° C., the hydrodynamic radii of the modified nanoparticles is 22 nm with a narrow size distribution suggesting that the nanoparticles are individually stabilized in aqueous solution due to the PNIPAM polymer chain being fully stretched below the critical temperature. By contrast, when the temperature of the suspension was increased over the critical temperature, the hydrodynamic radii of the nanoparticles increased to 80 nm at 35° C. as a result of the coil-to-globule transition of the PNIPAM polymer chain at temperatures above the critical temperature. Interestingly, the hydrodynamic radii of the nanoparticles remained around 82 nm even when the temperature of the suspension was further increased to 50° C. The stability of the hydrodynamic radii of the particles at higher temperatures is believed to be due to the PNIPAM blocks being insoluble in aqueous solution above the critical temperature. The decreased solubility of the complex at high temperatures is believed to be the result of the aggregation of the $CoFe_2O_4$ FMNPs, which is measured as an increase in hydrodynamic diameter by DLS. Interestingly, when the size of the aggregated nanoparticles is above the threshold, the aggregated nanoparticles begin to precipitate out from aqueous solution, but the de-precipitation of the particles is not detectable by the DLS measurement. As shown in FIG. 7, the aggregated particles redisperse back into solution when the temperature cools down below the critical temperature (in this case 32° C.); this redispersion phenomenon suggests that the temperature-meditated nanoparticle aggregation behavior of the PNIPAM blocks is repeatable. The $CoFe_2O_4$ FMNP@$PNIPAM_{68}$-b-$PAA_{28}$ complex, which combines the ferrimagnetic properties of an inorganic core, the tunable hydrodynamic diameter of nanoparticles in solution, and the thermal responsiveness of polymer shells, has useful applications to the development of magnetic drug delivery systems with controlled release rates.

In another embodiment, the FMNP@polymer complex may be conjugated with one or more fluorescent labels, biomolecules, and/or drugs at the periphery of the complex. In one embodiment, the FMNP@polymer complex is derivatized with a reactive functionality and the fluorescent labels, biomolecules, and/or drugs are conjugated to the reactive functionality. While it is preferred that fluorescent labels and biomolecules are conjugated to reactive functionalities, one of skill in the art will appreciate that it may not be necessary for certain drugs to be conjugated to reactive functionalities. Examples of block copolymer reactive functionalities include, without limitation, alcohols, amines, thiols, acrylates, maleimides, alkenes, alkynes, iodides, bromides, and chlorides. Example 10 describes the conjugation of 5-carboxyfluorescein succinimidyl ester to the amine terminated FMNP@polymer complex, $CoFe_2O_4$ FMNP@$NH_2$-PEG-b-PAA. Examples of biomolecules that may be conjugated to an FMNP@polymer complex of the present invention include without limitation, DNA, proteins, glycoproteins, peptides, antibodies, antigens, and carbohydrates. Examples of drug classes that may be conjugated to an FMNP@polymer complex of the present invention include without limitation, anti-inflammatory agents and chemotherapy agents (also referred to as anti-tumor and/or cytotoxic agents). Examples of anti-inflammatory agents (also referred to as non-steroidal anti-inflammatories or NSAIDS) that may be conjugated to the FMNP@polymer complex of the present invention include without limitation, aspirin, ibuprofen, celecoxib, indomethacin, and diclofenac. Examples of chemotherapy agents that may be conjugated to the FMNP@polymer complex of the present invention include without limitation, nucleoside agents, such as 5-fluorouracil, 6-mercaptopurine, arabinosylcytosine, capecitabine, clofarabine, cytarabine, dacarbazine, fludarabine, gemcitabine and nelarabine; intercalating agents, such as oxaliplatin, cisplatin and carboplatin; spindle inhibitors, such as the taxane drugs docetaxel and paclitaxel, ixabepilone, and the vinca alkaloids vindesine, vincristine, vinorelbine, and vinblastine; and folate inhibitors, such as methotrexate and, pemetrexed.

Figure 8:
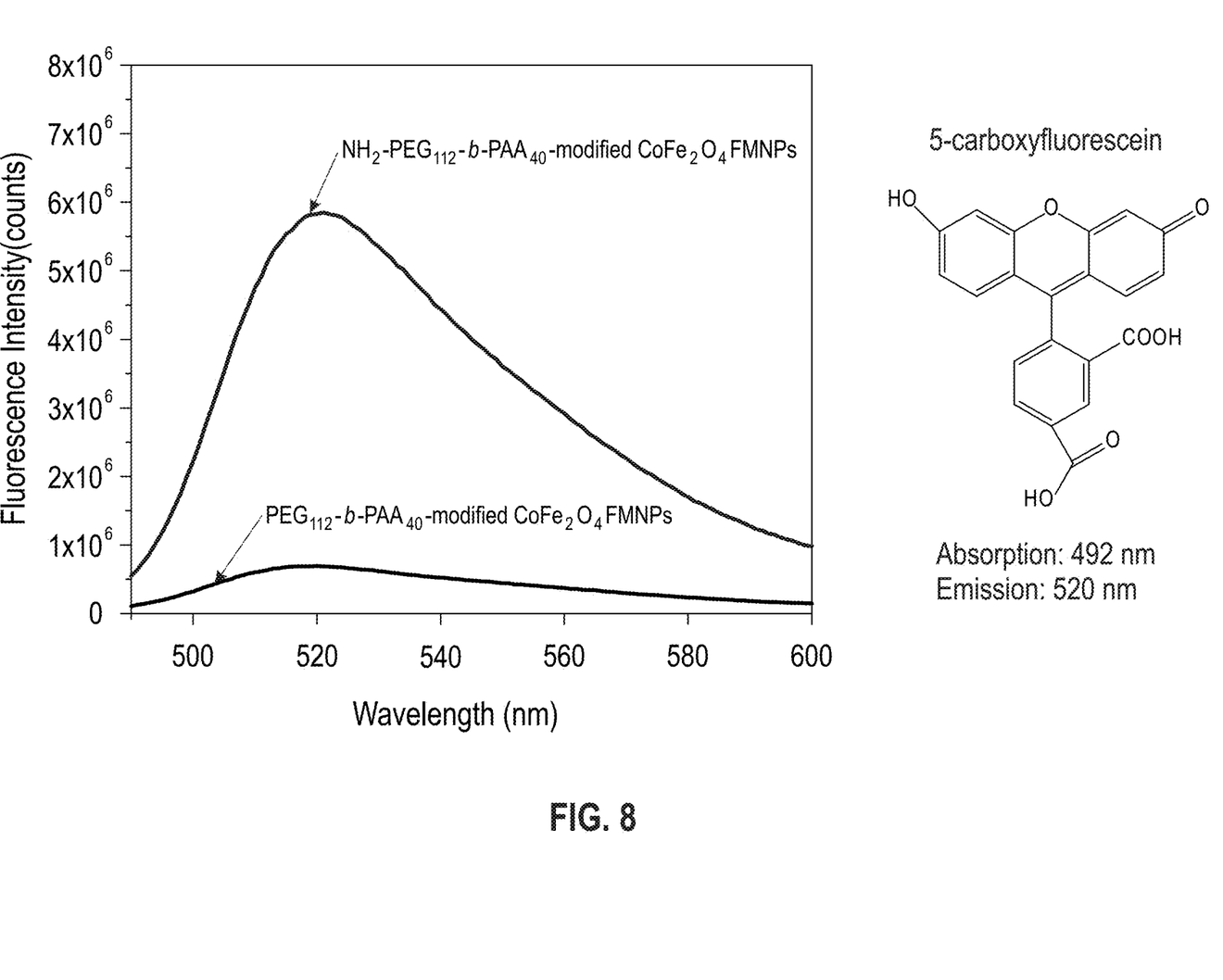
FIG. 8 is a graph showing the fluorescence intensity of $PEG_{112}$-b-$PAA_{40}$ modified $CoFe_2O_4$ FMNPs and $NH_2$-$PEG_{112}$-b-$PAA_{40}$ modified $CoFe_2O_4$ FMNPs.

Examples 3 and 4 describe the synthesis of the block copolymer $NH_2$-$PEG_{112}$-b-$PAA_{40}$. Similar to the $CoFe_2O_4$ FMNP@$PEG_{112}$-b-$PAA_{40}$ complexes, the $CoFe_2O_4$ FMNP@$NH_2$-$PEG_{112}$-b-$PAA_{40}$ complexes enhanced colloidal stability and enabled the complex to be dispersed in water and buffered solutions without any particle agglomeration. Example 10 describes the conjugation of the fluorescent label 5-carboxyfluorescein onto a $CoFe_2O_4$ FMNP@$NH_2$-$PEG_{112}$-b-$PAA_{40}$ complex. The reaction between the carboxylic acid group of the 5-carboxyfluorescein and the amine group of the $CoFe_2O_4$ FMNP@$NH_2$-$PEG_{112}$-b-$PAA_{10}$ complex was facilitated using EDC and sulfo-NHS as reagents. FIG. 8 shows the photoluminescence spectrum of the purified $CoFe_2O_4$ FMNP/dye conjugates under the excitation at 492 nm. The presence of dyes on the particle surface of the complex is clearly evident by the characteristic emission peak at 520 nm. As a comparison, a control experiment was conducted with $PEG_{112}$-b-$PAA_{40}$ modified $CoFe_2O_4$ FMNPs without amine groups. The control $CoFe_2O_4$ FMNP@$PEG_{112}$-b-$PAA_{10}$ complex was incubated with the 5-carboxyfluorescein dyes under the same coupling conditions as the $CoFe_2O_4$ FMNP@$NH_2$-$PEG_{112}$-b-$PAA_{10}$ complex. As shown in FIG. 8, the fluorescence emission intensity of the control complex was six times lower than that of the $CoFe_2O_4$ FMNP@$NH_2$-$PEG_{112}$-b-$PAA_{10}$ complex. The very low fluorescent intensity of the control complex was most likely a result of the physical absorption of dye molecules onto the particle surface, in contrast to the chemical bonding of 5-carboxyfluorescein.

It is to be understood that while the invention has been described in conjunction with the embodiments set forth above, the foregoing description as well as the examples that follow are intended to illustrate and not limit the scope of the invention. Further, it is to be understood that the embodiments and examples set forth herein are not exhaustive and that modifications and variations of the invention will be apparent to those of ordinary skill in the art without departing from the scope and spirit of the invention.

All patents and publications mentioned herein are incorporated by reference in their entireties.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Where appropriate, the following techniques and equipment were utilized in the Examples: $^1$H and $^{13}$C NMR spectra were obtained at room temperature on an Avance 400 MHz spectrometer. Quantitative $^{13}$C NMR was run at room temperature in acetone-$d_6$ in an inverse-gated $^1$H-decoupled mode using $Cr(acac)_3$ as a relaxation agent on an Avance 400 MHz spectrometer. Molecular weights were measured in tetrahydrofuran (THF) on a Waters Model 150 chromatograph relative to polystyrene standards. Infrared (IR) spectra were recorded on a Nicolet 510 FT-IR spectrometer on a film cast on a KBr plate.

Example 1

Synthesis of PEG-BR Macroinitiator

PEG-OH (20 g, $M_n$=5 k) was dissolved in 120 mL $CH_2Cl_2$, followed by the addition of 1 mL of $Et_3N$ and 1.1 mL of 2-bromisobutyryl bromide. The reaction mixture was stirred at ambient temperature for 2 d then passed through 0.2 μm filter. The solution was subsequently extracted with 100 mL of deionized $H_2O$, 1 M HCl, and 1 M $NaHCO_3$ and then dried using $MgSO_4$. The product was precipitated in $Et_2O$ and dried overnight under vacuum.

Example 2

Synthesis of PEG-b-PAA Diblock Copolymer

The macroinitiator PEG-Br (5.3 g) plus CuBr (150 mg), t-butylacrylate (4.5 mL), and anisole (20 mL) were added to a Schlenk flask and the solution was degassed three times via freeze-pump-thaw cycles. PMDETA (0.25 mL) was added to the solution and the reaction mixture was heated at 90° C. for 5 h. The reaction was stopped by submersing the flask in liquid $N_2$ and the reaction solution was passed through an $Al_2O_3$ column to remove the Cu catalyst. The polymer solution was precipitated twice in $Et_2O$ to remove the unreacted monomers and then dried overnight under vacuum. $M_n$=10.9 k; PDI=1.05. The PEG-b-PtBA (1.2 g) was dissolved in $CH_2Cl_2$ (10 mL), and a five-fold molar excess of trifluoroacetic acid (with respect to the t-butyl groups) was added to the solution. The solution was then stirred at room temperature for 24 h. The resulting PEG-b-PAA diblock copolymer was precipitated from hexane and dried under vacuum.

Example 3

Synthesis of BocNH-PEG-Br Macroinitiator

BocNH-PEG-OH (1 g, $M_n$=5 k) was dissolved in 25 mL $CH_2Cl_2$, followed by the addition of $Et_3N$ (150 μL, 1 mmol) and 2-bromisobutyryl bromide (180 μL, 1 mmol). The reaction mixture was stirred at ambient temperature for 2 d then passed through 0.2 um filter. The solution was then extracted with 50 mL of deionized $H_2O$, 1 M HCl, and 1 M $NaHCO_3$ and dried with $MgSO_4$. The resulting product was precipitated in $Et_2O$ and dried overnight under vacuum.

Example 4

Synthesis of $NH_2$-PEG-b-PAA Diblock Copolymer

The microinitiator BocNH-PEG-Br (0.5 g) plus CuBr (36 mg), t-butylacrylate (1 mL), and anisole (4 mL) were added to a Schlenk flask and degassed three times via freeze-pump-thaw cycles. PMDETA (0.1 mL) was added to the mixture and the reaction mixture was heated at 90° C. for 4 h. The reaction was stopped by submersing the flask in liquid $N_2$ and the reaction solution was passed through an $Al_2O_3$ column to remove the Cu catalyst. The polymer solution was precipitated twice in $Et_2O$ to remove the unreacted monomers and then dried overnight under vacuum. $M_n$=8.1 k; PDI=1.10. The resulting Boc-NH-PEG-b-PtBA (0.6 g) was dissolved in $CH_2Cl_2$ (10 mL), and a five-fold molar excess of trifluoroacetic acid (with respect to the t-butyl groups) was added to the solution. The solution was then stirred at room temperature for 10 h. The resulting NH2-PEG-b-PAA was precipitated from hexane and dried under vacuum.

Example 5

Synthesis of PNIPAM-Cl Macroinitiator

N-isopropylacrylamide (2.0 g, 17.7 mmol), CuCl (17.7 mg, 0.177 mmol), $Me_6TREN$ (42 mg, 0.177 mmol), and 2-propanol (4.0 g) were combined into a Schlenk flask. The reaction mixture was degassed via three freeze-pump-thaw cycles. 2-Chloropropionate (22 mg, 0.177 mmol), charged with a syringe, was used to initiate the polymerization and the reaction was maintained for 10 h at room temperature. The polymerization reaction was stopped by submersing the flask in liquid $N_2$ and the Cu catalyst was removed by passing the solution through an $Al_2O_3$ column. The polymer solution was precipitated twice in $Et_2O$ to remove the unreacted monomers and finally, the solution was dried overnight under vacuum. $M_n$=8.5 k, PDI=1.05.

Example 6

Synthesis of PNIPAM-b-PAA Diblock Coplymer

The macroinitiator PNIPAM-Cl (2.0 g) plus CuCl (40 mg/0.4 mmol), $Me_6TREN$ (120 mg/0.4 mmol), t-butylacrylate (0.6 g), butanone (1.4 mL), and isopropanol (0.6 mL) were combined in a Schlenk flask. The reaction mixture was degassed via three freeze-pump-thaw cycles and maintained at 80° C. for 6 h. The resulting block copolymer was purified by first passing the reaction mixture through an $Al_2O_3$ column to remove the Cu catalyst and then adding the reaction mixture to $Et_2O$ to produce a gummy residue. The final product, PNIPAAM-b-PtBA, was dried overnight in a vacuum. $M_n$=12.1 k, PDI=1.09. The PNIPAAM-b-PtBA (1.6 g) was then dissolved in $CH_2Cl_2$ (10 mL) and mixed with a five-fold molar excess of trifluoroacetic acid (with respect to the t-butyl groups). The solution was stirred at room temperature for 10 h. The resulting PNIPAAM-b-PAA block copolymer was precipitated from hexane and dried under vacuum.

Example 7

Synthesis of mPEG-b-PCL-b-PAA Triblock Copolymer

The diblock copolymer mPEG-b-PCL was synthesized by ring-opening polymerization of ε-caprolactone (ε-CL) using mPEG (Mn=5000 g.$mol^{-1}$) as a macroinitiator and triazabicyclodecene (TBD) as the catalyst. In a glove box, ε-CL (dried over $CaH_2$) (5.7 g, 50 mmol) and mPEG (azeotroped in benzene) (5.0 g, 1.00 mmol) were dissolved in 20 mL of anhydrous dichloromethane (DCM) in a vial equipped with a magnetic stirring bar. TBD (139.2 mg, 1 mmol) was added to the mixture and the reaction was allowed to proceed for 2 h, at which time the reaction mixture was quenched with benzoic acid and purified by precipitation into cold diethyl ether. The mixture was then vacuum dried over night to obtain pure mPEG-PCL as a white solid. The CL monomer conversion was determined by $^1H$ NMR spectroscopy before precipitation with $Et_2O$. The molecular weight the PCL segment in the block copolymer was determined by the intensity of the terminal methoxy proton signal of mPEG at δ 3.31 ppm and the methylene proton signal of PCL at δ 2.29 ppm by $^1H$ NMR spectroscopy.

In a 100 mL flask, with stirring, mPEG-PCL (5 g, 0.5 mmol), 2-bromo-2-methyl propionic acid (418 mg, 2.5 mmol), and dicyclohexylcarbodiimide (DCC) (516 mg, 2.5 mmol) were dissolved in 20 mL of anhydrous DCM and the mixture was cooled to 0° C. A catalytic amount of 4-Dimethylaminopyridine (DMAP) (14 mg, 0.1 mmol) was added to the mixture, which was left at room temperature for 24 h, at which time the reaction mixture was quenched with benzoic acid and precipitated in cold $Et_2O$/MeOH (10:1) to yield a diblock copolymer macroinitiator.

The PAA block was grown from a PAA diblock copolymer macroinitiator via atom transfer radical polymerization (ATRP) of t-butylacrylate using the protocol as described in Example 2.

Example 8

Synthesis of Ferrimagnetic $CoFe_2O_4$ Nanoparticles

The following ingredients were mixed and mechanically stirred under a flow of $N_2$: 2 mmol $Fe(acac)_3$; 1 mmol $Co(acac)_2$; 10 mmol 1, 2-hexadecaediol; 6 mmol oleic acid; 6 mmol oleylamine; and 20 mL of benzyl ether. The mixture was heated to 200° C. for 2 h and then, under a blanket of $N_2$, heated to reflux (~300° C.) for 1 h. The resulting black colored mixture was cooled to room temperature by removing the heat source. Under ambient conditions, 40 mL of ethanol was added to the mixture and a black material was precipitated by centrifugation at 6000 rpm for 10 min. The black precipitate was dissolved in hexane with 0.1% oleic acid and the mixture was centrifuged at 6000 rpm for 10 min to remove any undispersed residue. The product was then precipitated with ethanol, centrifuged to remove the solvent, and dried overnight in a vacuum. The resulting $CoFe_2O_4$ FMNPs have an average diameter of 6 nm with a narrow size distribution.

To grow the larger particles from the synthesized 6 nm $CoFe_2O_4$ FMNPs, the following ingredients were mixed and mechanically stirred under a flow of $N_2$: 2 mmol $Fe(acac)_3$; 1 mmol $Co(acac)_2$; 10 mmol 1, 2-hexadecaediol; 2 mmol oleic acid; 2 mmol oleylamine; and 20 mL of benzyl ether. Next, 6 mL of the synthesized 6 nm $CoFe_2O_4$ MNP hexane solution (15 mg/mL) was added to the mixture, which was first heated to 100° C. for 30 min to remove hexane, and then increased to 200° C. for 1 h. Under a blanket of $N_2$, the mixture was further heated to 300° C. for 30 min. Following the foregoing procedure, monodispersed $CoFe_2O_4$ FMNPs with a diameter of 15 nm were obtained. The seed mediated growth method described herein was repeated to prepare 18 nm monodispersed $CoFe_2O_4$ FMNPs.

Example 9

Synthesis of $CoFe_2O_4$ FMNP@PEG-b-PAA Polymer Complex

The 18 nm oleic acid coated $CoFe_2O_4$ FMNPs described in Example 8 (10 mg) were dispersed into anhydrous THF (2 mL) to form a 5 mg/mL solution. This nanoparticle solution was then mixed with the PEG-b-PAA block copolymer described in Example 2 (4 mL, 5.0 mg/mL solution in THF). The solution was stirred at room temperature for 48 h and then added dropwise to 20 mL of $H_2O$ with magnetic stirring. THF and unreacted polymers were removed by dialysis (MWCO=12,000-14,000) against water for 3 d. The solution was then centrifuged at 6000 rpm for 10 min to remove any large aggregates that may have formed during the process.

Example 10

Conjugation OF 5-Carboxyfluorescein onto $CoFe_2O_4$ FMNP@PEG-b-PAA Polymer Complex A dimethylformamide (DMF) solution (400 µL) of 5-carboxyfluorescein succinimidyl ester (0.3 mg/mL) was added to an aqueous solution of $CoFe_2O_4$ FMNP@$NH_2$-PEG-b-PAA (2 mL, 0.5 mg/mL). The mixture was reacted for 24 h at room temperature, and filtered with a dialysis membrane (MWCO: 12,000-14,000) for 48 h to remove any unreacted dyes. Fluorescence of the resulting suspension was measured with excitation at 492 nm and emission was collection from 500 to 600 nm. The same experimental procedures were followed for samples prepared from $CoFe_2O_4$ FMNP@PEG-b-PAA.

We claim:

1. A composition comprising a polymer complex comprising:
   a ferrimagnetic inorganic core comprising ferrimagnetic nanoparticles selected from the group consisting of $BaFeO$, $SrO.6Fe_2O_3$, and $SrFe_{12}O_{19}$; and
   a thermally responsive outer shell comprising a water-soluble block copolymer in direct contact with the ferrimagnetic nanoparticles through multiple anchoring points, wherein, are,
   the water-soluble block copolymer sterically counterbalances magnetically induced aggregation of the ferrimagnetic nanoparticles in the ferrimagnetic inorganic core,
   the ferrimagnetic nanoparticles do not agglomerate at ambient temperatures in the range of 289-300 K (15-27° C.; 60-80° F.), and
   in the absence of an applied magnetic field, the ferrimagnetic nanoparticles have a nonzero net magnetic moment at ambient temperatures.

2. The composition of claim 1, wherein the water-soluble block polymer comprises a polymer block selected from poly(acrylic acid) (PAA) and poly(methacrylic acid) (PMA).

3. The composition of claim 2, wherein the water-soluble block copolymer further comprises a polymer block selected from the group consisting of poly(ethylene glycol), poly(acrylates), poly(methacrylates), poly(esters), poly(acrylamides), poly(carbonates), poly(norbornenes), poly(acetals), poly(ketals), and derivatives thereof.

4. The composition of claim 2, wherein the water-soluble block copolymer has a weight average molecular weight between 1000 and 500,000.

5. The composition of claim 4, wherein the water-soluble block copolymer has a weight average molecular weight between 7,000 and 30,000.

6. The composition of claim 1, wherein the water-soluble block copolymer is a diblock copolymer.

7. The composition of claim 6, wherein the diblock copolymer is selected from the group consisting of poly(ethylene glycol)-b-poly(acrylic acid) (PEG-b-PAA); $NH_2$-PEG-b-PAA; and poly(N-isopropylacrylamide)-b-poly(acrylic acid) (PNIPAM-b-PAA).

8. The composition of claim 1, wherein the water-soluble block copolymer is a triblock copolymer.

9. The composition of claim 8, wherein the triblock copolymer is selected from the group consisting of poly(ethylene glycol)-b-poly(caprolactone)-b-poly(acrylic acid) (PEG-b-PCL-b-PAA), poly(ethylene glycol)-b-poly(L-lactide)-b-poly(acrylic acid) (PEG-b-PLL-b-PAA), poly(ethylene glycol)-b-poly(D-lactide)-b-poly(acrylic acid) (PEG-b-PDL-b-PAA), and poly(ethylene glycol)-b-poly(DL-lactide)-b-poly(acrylic acid) (PEG-b-PDLL-b-PAA).

10. The composition of claim 1, wherein the water-soluble block copolymer is terminated at one end with a reactive functionality.

11. The composition of claim 10, wherein the reactive functionality is selected from the group consisting of alcohols, amines, thiols, acrylates, maleimides, alkenes, alkynes, iodides, bromides, and chlorides.

12. The composition of claim 10, wherein the polymer complex with the reactive functionality is conjugated with one or more fluorescent labels.

13. The composition of claim 10, wherein the polymer complex with the reactive functionality is conjugated with one or more biomolecules.

14. The composition of claim 13, wherein the biomolecules are selected from the group consisting of DNA, proteins, glycoproteins, peptides, antibodies, antigens, and carbohydrates.

15. The composition of claim 1, wherein the polymer complex is conjugated with one or more drugs.

16. The composition of claim 15, wherein the one or more drug is selected from anti-inflammatory agents and chemotherapy agents.

17. A composition comprising a polymer complex comprising a ferrimagnetic inorganic core in direct contact with a thermally responsive water-soluble block copolymer, wherein the ferrimagnetic inorganic core is comprised of ferrimagnetic nanoparticles selected from the group consisting of BaFeO, $SrO.6Fe_2O_3$, and $SrFe_{12}O_{19}$, the composition has a tunable hydrodynamic diameter in solution, the polymer complex is free of oleic acid surfactants and has colloidal stability in solution, the thermally responsive water-soluble block copolymer sterically counterbalances magnetically induced aggregation of the ferrimagnetic nanoparticles in the ferrimagnetic inorganic core, the ferrimagnetic nanoparticles do not agglomerate at ambient temperatures in the range of approximately 289-300 K (15-27° C.; 60-80° F.), and in the absence of an applied magnetic field, the ferrimagnetic nanoparticles have a nonzero net magnetic moment at ambient temperatures.

18. The composition of claim 17, wherein the thermally responsive water-soluble copolymer shell is $PNIPAM_{68}$-b-$PAA_{28}$.

19. The composition of claim 17, wherein the thermally responsive water-soluble block copolymer surrounds the ferrimagnetic inorganic core and is bound to the ferrimagnetic nanoparticles through multiple anchoring points.

20. The composition of claim 1, wherein the composition has a tunable hydrodynamic diameter in solution.

21. A method of making the composition of claim 1 comprising the steps of:
    (a) preparing a macroinitiator comprising a water-soluble block polymer;
    (b) reacting the macroinitiator of step (a) with a block polymer selected from poly(acrylic acid) (PAA) or poly(methacrylic acid) (PMA) to produce a water-soluble block copolymer; and
    (c) reacting the water-soluble block copolymer of step (b) with a ferrimagnetic nanoparticle to produce the polymer complex.

22. The method of claim 21, wherein the water-soluble block polymer of step (a) comprises a polymer block selected from the group consisting of poly(ethylene glycol), poly(acrylates), poly(methacrylates), poly(esters), poly(acrylamides), poly(carbonates), poly(norbornenes), poly(acetals), poly(ketals), and derivatives thereof.

23. The method of claim 21, wherein the water-soluble block copolymer is a diblock or triblock copolymer.

24. The method of claim 21, wherein the water-soluble block copolymer of step (b) is terminated at one end with a reactive functionality.

25. The method of claim 24, wherein the polymer complex with the reactive functionality is conjugated with an agent selected from fluorescent labels, biomolecules, or a combination of both.

26. The method of claim 25, wherein the biomolecules are selected from the group consisting of DNA, proteins, glycoproteins, peptides, antibodies, antigens, and carbohydrates.

27. The method of claim 21, wherein the polymer complex is conjugated with a drug selected from anti-inflammatory agents and chemotherapy agents.

* * * * *